United States Patent [19]

Hart, Jr.

[11] 4,410,561
[45] Oct. 18, 1983

[54] METHOD OF FORMING COATED OPTICAL FIBER

[75] Inventor: Arthur C. Hart, Jr., Chester, N.J.

[73] Assignee: Bell Telephone Laboratories, Incorporated, Murray Hill, N.J.

[21] Appl. No.: 288,789

[22] Filed: Jul. 31, 1981

[51] Int. Cl.³ .............................................. B05D 3/06
[52] U.S. Cl. .................................... 427/54.1; 156/48;
    156/94; 156/98; 264/272.15; 264/275; 427/140;
    427/163
[58] Field of Search ...................... 156/49, 51, 55, 48,
    156/94, 98; 427/54.1, 163, 140, 142; 264/271.1,
    272.11, 272.15, 275

[56] References Cited

U.S. PATENT DOCUMENTS

| 28,028 | 6/1874 | Maurer | 65/3 |
|---|---|---|---|
| 3,914,145 | 10/1975 | Forler et al. | 427/140 |
| 4,049,480 | 9/1977 | Kutsche | 156/94 |
| 4,091,062 | 5/1978 | Nelson | 156/49 |
| 4,135,587 | 1/1979 | Diaz | 156/49 |
| 4,152,539 | 5/1979 | Charlebois et al. | 156/49 |
| 4,201,618 | 5/1980 | Lewis | 156/502 |
| 4,217,027 | 8/1980 | MacChesney et al. | 350/96.3 |
| 4,270,021 | 5/1981 | Gold | 156/48 |

Primary Examiner—John H. Newsome
Attorney, Agent, or Firm—Samuel H. Dworetsky

[57] ABSTRACT

A method of coating uncoated portions of a coated optical fiber is disclosed. In this method a grooved split mold apparatus is used. This fiber, including coated portions of the fiber are placed within the groove and appropriately tensioned so as to prevent contact between the uncoated portions of the fiber and the mold. Injection molding techniques are then used to recoat the uncoated portions of the fiber.

7 Claims, 2 Drawing Figures

METHOD OF FORMING COATED OPTICAL FIBER

BACKGROUND OF THE INVENTION

This invention is a method of coating uncoated portions of an optical fiber so as to yield a continuously coated optical fiber of essentially uniform coating diameter.

DESCRIPTION OF THE PRIOR ART

The technology for forming low-loss optical fibers (see U.S. Pat. No. 4,217,027 and U.S. Pat. No. Re 28,028) has advanced to a point where commercial fabrication of optical fibers is widely prevalent. Most processing includes drawing an optical fiber from a previously fabricated glass boule, sometimes referred to as a "preform". During the drawing process the fiber is usually coated with a protective curable material which may be cured thermally, by radiation, or by other appropriate means.

The expansion of optical fiber applications to evermore hostile environments, such as in undersea cable, has placed more stringent requirements on physical properties of the fiber, such as strength. For these more demanding applications, as well as for other less demanding applications, it will become increasingly more common to splice optical fibers which have broken, either accidentally, or during appropriate proof testing. Additionally, extremely long lengths of fiber may be obtained by splicing the 5–50 kilometer lengths which are obtained using current fabrication technologies. For these and other applications, fusion splicing provides a viable means for joining the ends of two glass fibers with acceptable loss penalty. However, recoating of the spliced fiber portion persists as a difficult hurdle to overcome, especially while maintaining stringent requirements on dimensional and strength parameters associated with the coated fiber.

SUMMARY OF THE INVENTION

This invention is a method of coating uncoated portions of a coated optical fiber which have been bared, for example, during splicing operations. The method involves placing the fiber within a groove such as a semicircular or V-groove in a split mold apparatus. The effective diameter of the groove is somewhat greater than that of the remaining coated portions of the fiber. The fiber is tensioned so that only the coated portions of the fiber touch the groove, while the vulnerable uncoated portions of the fiber remain suspended and do not contact the groove surface. The mold is closed and appropriate coating material is injected into the groove until it reaches the coated portion of the fiber. The molding material is then cured yielding a recoated section with dimensional characteristics essentially identical to those of the original coated fiber.

DETAILED DESCRIPTION

The invention is a technique for forming a continuously coated fiber from a fiber, a portion of whose coating has been removed, such as, for example, during splicing. The invention consists of recoating the fiber in a split mold shown schematically in two perspectives in FIGS. 1 and 2. A clearer understanding of the invention will be obtained upon description of these Figures.

Figure 1:
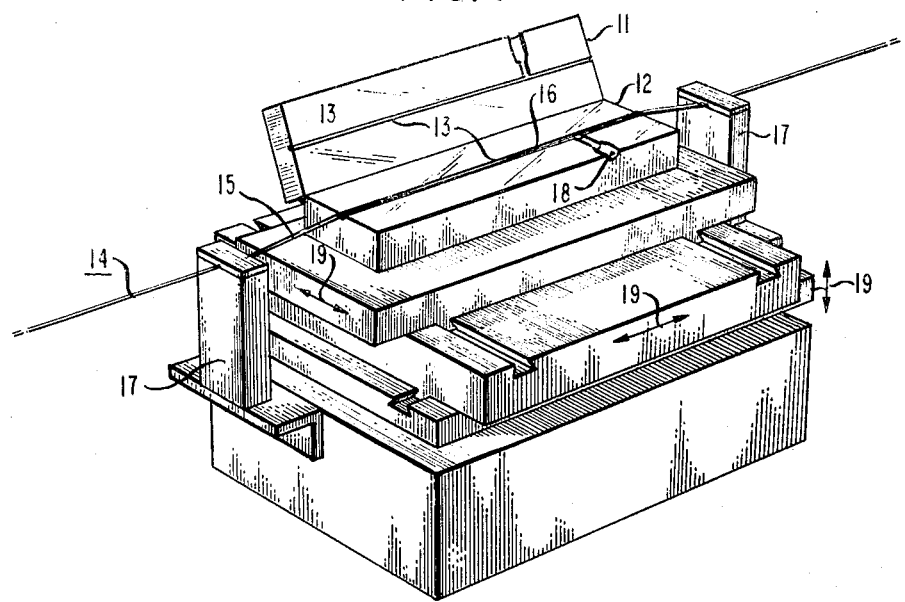
FIGS. 1 and 2 are perspectives of the molding apparatus.
Figure 2:
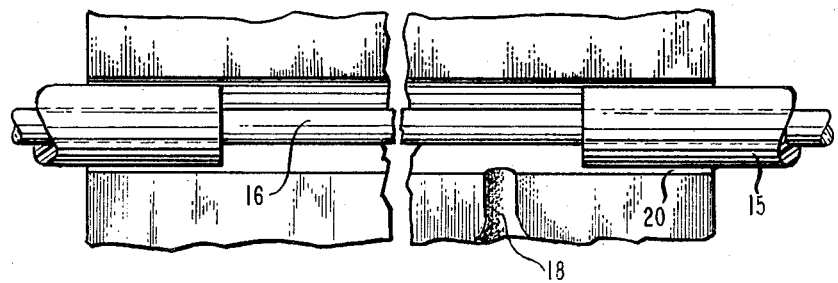

In FIG. 1, 11 and 12 are two sections of a split mold in which an appropriate and exemplary semicircular groove 13 has been formed. The fiber 14 has an uncoated section 15 and a coated section 16. The diameter of the groove, D, is somewhat greater than the diameter of the coated fiber, d. In most embodiments of this invention the diameter of the mold groove will be less than $d+0.006$ inches and usually less than $d+0.002$ inches. Ideally, the difference in diameter should be as small as possible to obtain a coated fiber with a diameter as uniform as possible.

The fiber is aligned over the groove in one-half of the split mold, using exemplary micropositioners shown schematically as 19. The distance between the fiber and the mold is then reduced such that the coated portion of the fiber contacts the groove while the uncoated portion of the fiber is suspended partially within the groove but does not contact it (see the schematic of the closed mold in FIG. 2). These conditions may be obtained by appropriately tensioning the fiber so that the uncoated portion of the fiber does not "droop" and touch the groove. In FIG. 1, the apparatus is shown with tensioning devices 17, such as appropriately spring-loaded micropositioners, which maintain the fiber under appropriate tension, usually about 1 pound but generally less than 10 pounds and greater than 0.1 pound. In FIG. 1, the mold has been positioned to contact the coated portions of the fiber at 13, thereby somewhat distorting the fiber, as shown, in order to insure that the coated portions of the fiber are properly seated in the groove.

After positioning the fiber within the groove, the second half of the mold is closed with its groove likewise aligned over the fiber. Appropriate coating material is then injected into the mold, for example, through a groove 18 as shown in the Figures. It is important to note that even after the mold is closed portions of the coated fiber do not contact the mold due to the fact that the diameter of the groove is somewhat greater than the diameter of the coated portions of the fiber (see 20, in FIG. 2). Upon injection of the coating material into the groove 13, the coating material surrounds the uncoated portion of the fiber. Air, as well as coating material, flows past the originally coated portion of the fiber by way of the small clearance 20 between the coated portion of the fiber and the mold. Observation of such flow of the coated material ensures that the entire uncoated portion of the fiber has been encircled with coating material.

Appropriate temperature, radiation and/or time is used to cure the coating material. Various coating materials may be used such as, for example, epoxies, silicones, and UV curable acrylates. The coating may be fully cured within or even outside the mold.

EXAMPLE 1

A split steel mold, each portion of which contains a matching semicircular groove to accommodate the fiber, was used. The grooves, when clamped together, formed a cylindrical bore slightly larger than the coated fiber OD to permit escape of air during injection of the coating material. The original coating in this arrangement served to keep the uncoated section suspended in the bore. Using as short an uncoated length as possible, for example, half an inch, the possibility of damage through contact with the bore is minimized. Perpendicular to the fiber groove is an additional groove through which the coating material is injected. A series of clamps to hold and tension the fiber, so as to prevent the splice section from touching the bore, was used, and a movable mount for positioning the mold relative to the fiber was also used. Small toggle clamps at either end served to hold the fiber while the micromanipulator at the right-hand clamp is used to pull the fiber taut. Springs in the micromanipulator limit the amount of tension that can be applied. The mold is mounted on another micromanipulator platform that can be positioned in two planes. With this arrangement the fiber can be held above the opening in the mold and the mold can be carefully raised from below the fiber, and positioned as it is being raised, so that the fiber rests in the groove without the uncoated portion of the fiber touching the mold. Once the fiber is in position, the upper half of the mold is clamped in position and the coating material injected into the mold via a plastic syringe and clamp arrangement. Initial work to prove feasibility of the technique was carried out with short striped sections of fiber drawn from Supersil 2 marketed by Heraeus Amersil and coated with an epoxy acrylate resin. These were recoated using a rapid cure epoxy. The fiber was stripped using concentrated sulfuric acid at approximately 200 degrees Celsius for 10-15 seconds. A longer immersion time results in a large swelling at the end of the original coating. This can effectively seal off clearance in the bore of the mold resulting in incomplete filling.

About 1.5 cm of the original coating was stripped in the acid. The uncoated fiber section was rinsed in acetone and positioned in the mold as described. The epoxy was mixed and injected slowly into the mold to prevent the viscous material from pushing the taut uncoated fiber against the mold surface. Once movement of the syringe plunger was no longer perceptible, the clamp was positioned about the mold and syringe and pressure applied until there was evidence of epoxy issuing from either end of the mold about the original coating of the fiber. For this work, the groove ID was 12 mils, while the fibers reported on here had coating OD's of 9-10 mils. The epoxy was allowed to cure at room temperature for 15-20 minutes before the fiber was removed from the mold.

EXAMPLE 2

An experiment to test strength involved restoring the coating on sections of stripped fiber at 10-foot intervals along a 90-foot length of 9 mil diameter nylon over silicone dual coated 110 micron single mode fiber. Eight restorations were made and the resulting length of fiber was run through a proof tester sequentially at 50, 100, 150 and 200 ksi. Seven recoated areas passed all the proof test levels while one failed at 200 ksi. Examination of the recoated areas of the fiber after proof testing revealed no noticeable difference in appearance nor evidence of coating failure due to stressing or bending in the proof tester.

EXAMPLE 3

An additional nine recoatings were made in short lengths of fiber using 10 mil OD urethane-acrylate coated 110 micron diameter fiber. The fibers were tensile tested to determine initial strength degradation due to recoating. Nine lengths of the original fiber with no recoating were also tensile tested as a control. It is evident from the data that the 5 minute epoxy recoating degrades the fiber strength relative to that of the original coated fiber. However, the mean strength of about 500 ksi renders the technique viable for coating splices.

EXAMPLE 4

Example 3 was repeated using, instead of the epoxy, a Room Temperature Vulcanizing (RTV) silicone as the recoating material. This material is high purity silicone containing no abrasive reinforcing resins. The technique employed was similar to that with the epoxy except that a hot air blower was directed on the mold to decrease the curing time of the silicone from 2 hours to about 10 minutes. The results indicate essentially no strength degradation due to recoating. The results demonstrate that the technique is successful as long as the coating material is carefully chosen.

EXAMPLE 5

Example 4 was repeated using a UV curable coating. For this experiment, the mold was made of acrylic sheet which, in some forms, transmits UV light. It should be noted that many forms of acrylic sheet contain UV absorbers and care must be taken to use acrylic sheets without UV absorber. The technique was used as previously disclosed and the UV curable acrylate resin was cured with a pulsed xenon arc lamp with a 4 second exposure. The lamp emits in the spectral range of 2000-4000 Angstroms at a pulse rate of 100 pulses per second, emitting 1.2 joules/pulse or 120 watts per 4 second burst. In this example, the recoating material was identical to that of the original coating material and hence yielded a continuously coated fiber with a uniform material coating. No degradation in fiber strength due to recoating was observed.

What is claimed is:

1. A method of fabricating a continuously coated optical fiber comprising,
    aligning an uncoated portion of a coated optical fiber with a groove in an open, grooved, split mold, the groove extending beyond the uncoated portions of the fiber to the coated portion of the fiber which adjoins the end of the uncoated portion of the fiber, the groove having a diameter, $D$, greater than the diameter, $d$, of the coated portion of the optical fiber,
    tensioning the optical fiber,
    reducing the distance between the open mold and the fiber so that the coated portion of the fiber contacts the groove surface while the uncoated portions of the fiber do not contact the groove surface,
    aligning the groove in the second half of the split mold with the optical fiber,
    closing the split mold,
    injecting a curable coating material into the groove until the coating material flows at least to the coated portion of the fiber and,
    curing the coated material,
    whereby a continuously coated optical fiber is obtained.

2. The method of claim 1 wherein the groove is semicircular or V-groove.

3. The method of claim 1 wherein the groove is semicircular and has a diameter, $D$, less than $d+0.006$ inches.

4. The method of claim 2 or 3 wherein the optical fiber is tensioned to a tension less than 10 pounds but greater than 0.1 pound.

5. The method of claim 4 wherein the curable coating material is essentially identical to the original coating material.

6. The method of claim 5 wherein the curable coating material is a UV curable material.

7. The method of claim 6 wherein the curable coating material is a UV curable coating material and wherein at least a portion of the mold is essentially transparent to UV radiation necessary to cure the UV curable material.

* * * * *